United States Patent
Podjarny et al.

(10) Patent No.: US 8,495,719 B2
(45) Date of Patent: Jul. 23, 2013

(54) CROSS-DOMAIN ACCESS PREVENTION

(75) Inventors: Guy Podjarny, Ottawa (CA); Ori Segal, Tel Aviv (IL); Adi Sharabani, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 12/243,987

(22) Filed: Oct. 2, 2008

(65) Prior Publication Data

US 2010/0088761 A1    Apr. 8, 2010

(51) Int. Cl.
H04L 29/06    (2006.01)

(52) U.S. Cl.
USPC ............... 726/8; 726/22; 726/29; 709/223; 709/225

(58) Field of Classification Search
None
See application file for complete search history.

(56) References Cited

U.S. PATENT DOCUMENTS

| | | | | |
|---|---|---|---|---|
| 5,511,208 | A * | 4/1996 | Boyles et al. | 709/223 |
| 7,185,072 | B2 * | 2/2007 | Hada et al. | 709/220 |
| 7,426,186 | B2 * | 9/2008 | Acharya et al. | 370/238 |
| 7,689,671 | B2 * | 3/2010 | Bhakta et al. | 709/219 |
| 2004/0141463 | A1 * | 7/2004 | Acharya et al. | 370/238 |
| 2007/0050854 | A1 * | 3/2007 | Cooperstein et al. | 726/30 |
| 2007/0299857 | A1 * | 12/2007 | Gwozdz et al. | 707/102 |
| 2007/0300064 | A1 * | 12/2007 | Isaacs et al. | 713/168 |
| 2008/0021997 | A1 * | 1/2008 | Hinton | 709/225 |
| 2008/0222307 | A1 * | 9/2008 | Bhakta et al. | 709/245 |
| 2009/0119769 | A1 * | 5/2009 | Ross et al. | 726/13 |
| 2009/0292983 | A1 * | 11/2009 | Anand et al. | 715/234 |
| 2009/0300359 | A1 * | 12/2009 | Gao et al. | 713/171 |
| 2009/0327869 | A1 * | 12/2009 | Fan et al. | 715/240 |
| 2011/0196961 | A1 * | 8/2011 | Wang et al. | 709/224 |

FOREIGN PATENT DOCUMENTS

| | | | |
|---|---|---|---|
| EP | 1746763 A1 * | 1/2007 | |
| EP | 1368722 | 8/2007 | |
| WO | WO 2007137502 A1 * | 12/2007 | |

OTHER PUBLICATIONS

Hughes, Amy S.: "Use of Cooperation Across Semantic Boundaries to Enhance Network Object Caches", Ph.D. Dissertation Proposal, Computer Science Department, University of Southern California, May 2000.*
About allowing cross-domain data loading, Source: http://livedocs.adobe.com/flash/mx2004/main_7_2/00001097.html, Jul. 25, 2008, 3 pages.

* cited by examiner

*Primary Examiner* — Nathan Flynn
*Assistant Examiner* — Michael R Vaughan
(74) *Attorney, Agent, or Firm* — Cantor Colburn LLP; Jeff Tang

(57) ABSTRACT

A method, system, and computer program product for cross-domain access prevention are provided. The method includes detecting a request from a first domain to access a second domain, and applying cross-domain access heuristics to determine whether to allow the request. The cross-domain access heuristics define common ownership characteristics between the first domain and the second domain. The method further includes performing the requested access in response to determining that the request complies with at least one of the cross-domain access heuristics, and blocking the requested access in response to determining that the request fails to comply with the cross-domain access heuristics.

20 Claims, 3 Drawing Sheets

| DOMAIN NAME | IP ADDRESS | REGISTRANT | CONTACT INFORMATION | EXPIRATION DATE |
|---|---|---|---|---|
| EXAMPLE.COM | 111.255.012.210 | EXAMPLE, INC. | 123 MAIN ST. SPRINGFIELD, USA | NOV-1-2011 |
| ZYXT12.COM | 011.245.312.124 | EXAMPLE, INC. | 123 MAIN ST. SPRINGFIELD, USA | DEC-1-2011 |

FIG. 2

CROSS-DOMAIN ACCESS PREVENTION

BACKGROUND

The present invention relates to computer security, and more specifically, to cross-domain access prevention.

Cross-site scripting (XSS) and cross-site request forgery (XSRF) are examples of client-side computer security issues associated with accessing web pages. XSS and XSRF can occur in web applications that allow script or code injection by malicious users into the web pages viewed by other users. XSS and XSRF typically rely on malicious scripts (such as JavaScript) or code running on the victim's web browser to gather data from the web browser itself (e.g., cookies) and from additional requests submitted from the web browser on behalf of the victim. The gathered information is then passed on to hackers via the Internet or other means. The malicious scripts and/or code do not merely gather data but can also perform actions on the victim's behalf, for instance, transferring funds from bank accounts, forwarding emails, and initiating other web-based mischief.

SUMMARY

According to one embodiment of the present invention, a method for cross-domain access prevention is provided. The method includes detecting a request from a first domain to access a second domain, and applying cross-domain access heuristics to determine whether to allow the request. The cross-domain access heuristics define common ownership characteristics between the first domain and the second domain. The method further includes performing the requested access in response to determining that the request complies with at least one of the cross-domain access heuristics, and blocking the requested access in response to determining that the request fails to comply with the cross-domain access heuristics.

An additional embodiment is a system for cross-domain access prevention. The system includes a processing system configured to receive content from a first domain, and a cross-domain access filter executing on the processing system. The cross-domain access filter detects a request from the first domain to access a second domain, and applies cross-domain access heuristics to determine whether to allow the request. The cross-domain access heuristics defining common ownership characteristics between the first domain and the second domain. The cross-domain access filter performs the requested access in response to determining that the request complies with at least one of the cross-domain access heuristics, and blocks the requested access in response to determining that the request fails to comply with the cross-domain access heuristics.

A further embodiment is a computer program product for cross-domain access prevention. The computer program product includes a storage medium readable by a processing unit and storing instructions for execution by the processing unit for implementing a method. The method includes detecting a request from a first domain to access a second domain, and applying cross-domain access heuristics to determine whether to allow the request. The cross-domain access heuristics defines common ownership characteristics between the first domain and the second domain. The method of the computer program product further includes performing the requested access in response to determining that the request complies with at least one of the cross-domain access heuristics, and blocking the requested access in response to determining that the request fails to comply with the cross-domain access heuristics.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 2 depicts an example of domain data in accordance with exemplary embodiments.

DETAILED DESCRIPTION

The invention as described herein provides cross-domain access prevention. Client-side security issues, such as cross-site scripting (XSS) and cross-site request forgery (XSRF), typically involve placing code or scripts into a web page at one domain that is executed at the client-side, resulting in accessing a second domain to send hijacked information. For example, when viewing a web page, a user may inadvertently trigger a rogue script to execute that hijacks the user's cookies or performs other actions detrimental to the user. The user may be accessing a trusted web site, but the script or code that is executed can send the user's data to another Internet domain without the user's knowledge. In an exemplary embodiment, a cross-domain access (XDA) filter monitors for access attempts to a second domain from a first domain, while accessing content at the first domain, which is referred to herein as a cross-domain access request. In response to detecting the cross-domain access request, the XDA filter applies XDA heuristics to determine whether to allow the request. The XDA heuristics define common ownership characteristics between the first domain and the second domain, which are deemed sufficient to allow or block the access request. The XDA filter can be implemented locally at the client-side. The client may also utilize a domain resolver and cache to assist in determining whether domain names and/or Internet protocol (IP) addresses share common ownership characteristics. The cache can be periodically updated to ensure that it contains fresh data, while reducing the frequency of accesses to look up domain information. The client may forward a request to an Internet service provider (ISP) if the desired information is not available in the client's local cache or if the local cache is not implemented. The client may also initiate a query for domain data at a domain server, such as a domain registrar (e.g., a WHOIS query for ownership information) or a domain name system (DNS) server for IP-to-domain name mapping data.

Figure 1:
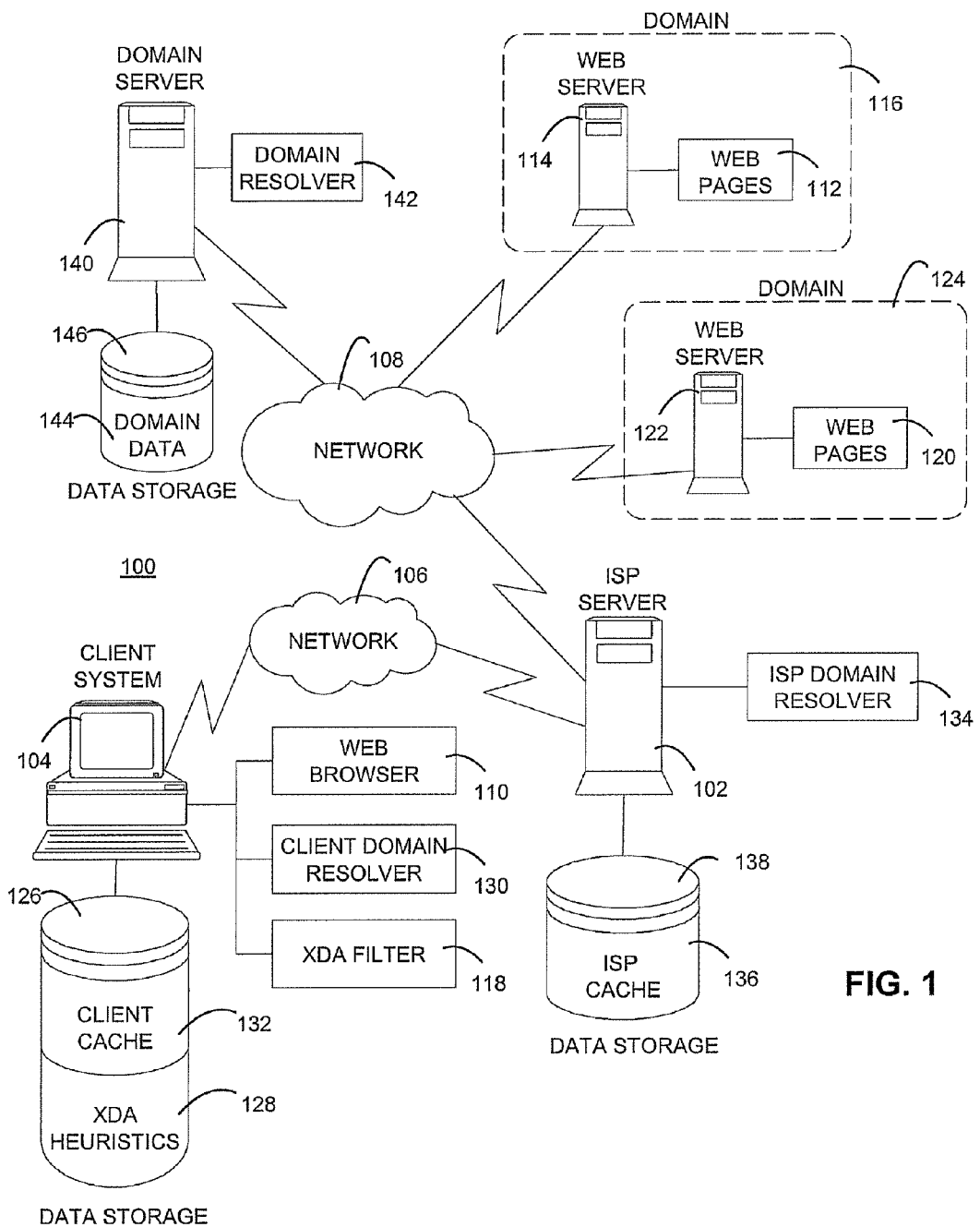
FIG. 1 depicts a block diagram illustrating an exemplary system that may be utilized to implement exemplary embodiments of the present invention.

Turning now to the drawings, it will be seen that in FIG. 1 there is a block diagram of a system 100 upon which cross-domain access prevention is implemented in exemplary embodiments. The system 100 of FIG. 1 includes an ISP server 102 in communication with a client system 104 over a network 106. In exemplary embodiments, the ISP server 102 includes one or more high-speed processing devices (e.g., mainframe computers) including at least one processing circuit (e.g., a CPU) capable of reading and executing instructions, and handling numerous requests from the client system 104 to access network 108. The ISP server 102 may perform as a firewall and point of access between the client system 104 and other servers via the network 108. The system 100 may also include a web gateway (not depicted) between the client system 104 and the ISP server 102 to monitor outgoing traffic and handle internal internet-related activity for network 106, e.g., an access point to an enterprise. The web gateway may perform domain name caching for an enterprise that includes the client system 104, as well as additional client systems 104 and/or servers (not depicted). It will be understood that additional computer systems and/or firewalls can be inserted in the communication paths between the elements of FIG. 1 utilizing various network architectures known in the art.

The client system 104 may be a desktop, laptop, general-purpose computer device, and/or networked device with one or more processing circuits and I/O interfaces, such as a keyboard and display device (e.g., web-enabled phone or handheld device). A user can initiate various tasks locally on the client system 104, such as executing a web browser 110 to interact with content on various servers, for instance, web pages 112 on web server 114 of domain 116.

The networks 106 and 108 may be any type of communications networks known in the art. For example, the networks 106 and 108 may be intranets, extranets, or internetworks, such as the Internet, or a combination thereof. The networks 106 and 108 can include wireless, wired, and/or fiber optic links.

In an exemplary embodiment, the client system 104 executes an XDA filter 118 to monitor and filter content accessed via the web browser 110, e.g., the web pages 112. The XDA filter 118 can be a plug-in, module, assistance object, or separate application that enhances security of the client system 104. As the web browser 110 processes web content, it may detect a request to access a domain that differs from the domain from which it acquired the content. For example, code or scripts may be encountered on one of the web pages 112 of domain 116 requesting access to one or more web pages 120 on web sever 122 of domain 124. In response to determining that a cross-domain access attempt has been requested (from domain 116 to domain 124), the XDA filter 118 may examine XDA heuristics 128 on data storage device 126. The XDA heuristics 128 can include a variety of heuristics used to determine whether to allow or block access to another domain. Example heuristics include allowing the request in response to determining that the first domain and the second domain have a common higher-level domain, a common IP address or subnet, or are registered to a common owner. The web browser 110 may enable or disable the XDA filter 118, as well as select heuristics to implement in the XDA heuristics 128 based on configurable security level settings.

The client system 104 may also execute a client domain resolver 130 to assist in mapping domain names to IP addresses in support of the XDA heuristics 128. When the web browser 110 encounters a domain name, such as "example.com", the client domain resolver 130 can be used to determine an associated IP address that maps to the domain name. The client domain resolver 130 may access a client cache 132 on the data storage device 126 to determine whether the domain to IP address mapping has been previously performed. The client cache 132 can store domain data temporarily to prevent delays and excess network traffic associated with resolving each domain name encountered. The client cache 132 may include a "time to live" parameter with each entry or other expiration information that informs the client domain resolver 130 when the entries in the client cache 132 should be flushed or refreshed. The client cache 132 may include additional information associated with domain name and IP address values, such as ownership information. The ownership information can be acquired from a domain registrar, using protocols, such as "WHOIS".

In an exemplary embodiment, when the client domain resolver 130 fails to locate the domain data in the client cache 132, the client domain resolver 130 initiates a request to an ISP domain resolver 134 executing on the ISP server 102 to determine whether the ISP domain resolver 134 can resolve the request. The ISP domain resolver 134 may manage an ISP cache 136 on a data storage device 138. In one embodiment, the ISP cache 136 contains similar information as the client cache 132; however, the ISP cache 136 is larger than the client cache 132, as the ISP server 102 services many client systems (not depicted). In an alternate embodiment, the ISP cache 136 does not include domain registrant information but does include domain to IP address mapping and a time to live parameter or other expiration information for each entry. In a further embodiment, the ISP cache 136 is omitted. If the ISP domain resolver 134 cannot resolve desired domain data from the ISP cache 136, the ISP domain resolver 134 may initiate a request for the desired domain data to one or more domain servers (e.g., domain server 140) across network 108. Domain server 140 represents one example of a server that executes a domain resolver 142 to extract domain related information from the domain data 144 in data storage device 146. In one embodiment, domain server 140 is a domain registration server that manages domain registration (i.e., ownership) information. The domain server 140 may also represent a DNS server with a wide visibility to many domain name to IP address mappings. Although only one domain server 140 is depicted in FIG. 1, it will be understood that the domain server 140 can represent a collection or hierarchy of servers that manage the domain data 146. Moreover, the data storage device 146 and the domain data 144 may be distributed across multiple storage devices on multiple servers.

The data storage devices 126, 138, and 146 refer to any type of computer readable storage media and may comprise secondary storage elements, e.g., hard disk drives (HDDs), tapes, or storage subsystems that are internal or external to the client system 104, ISP server 102, and domain server 140 respectively. Types of data that may be stored in the data storage devices 126, 138, and 146 include, for example, various files and databases. It will be understood that the data storage devices 126, 138, and 146 shown in FIG. 1 are provided for purposes of simplification and ease of explanation and are not to be construed as limiting in scope. To the contrary, there may be multiple data storage devices utilized by the client system 104, ISP server 102, and domain server 140.

The web pages 112 and 120 can be any hypertext transfer protocol (HTTP)-enabled content. The HTTP-enabled content may include secure HTTP, such as HTTP over a secure socket layer (HTTPS). Similarly, the web browser 110 may represent a portion or entire interface for accessing and executing web-based applications with HTTP-enabled content.

Further examples heuristics in the XDA heuristics 128 are as follows. Assuming that the client system 104 is accessing one of the web pages 112 of domain 116, where domain 116 is "example.com", and the accessed web page is at "example.com\index.htm", one of the heuristics compares the domain name of the cross accessed domain, e.g., domain 124. Assuming that in this example, domain 124 is "subject-matter.example.com" and one of the web pages 120 attempted to be cross-domain accessed is "subjectmatter.example.com\scoreboard.htm", the XDA heuristics 128 may be defined such that the client XDA filter 118 checks for a common high-level domain name for each domain 116 and 124. Since the check reveals that both domains are within the "example.com" domain hierarchy, a common ownership characteristic is established and the attempted cross-domain access is allowed.

In a further example, one or more domain resolvers (e.g., client domain resolver 130, ISP domain resolver 134, and/or domain resolver 142) are used to determine an IP address and/or subnet for the web servers 114 and 122. If different domain names map to the same IP address and/or subnet, then the requested cross-domain access is allowed. Alternatively, if an access request is in the form of an IP address, the lookup can be omitted if there is a match and performed if the requested IP address of web server 122 does not match web server 114. This heuristic supports intranets and multiple applications or sessions on a common device.

In another heuristics example in the XDA heuristics 128, a check is performed for common ownership, which may be established during domain registration. For instance, the XDA filter 118 can use the client domain resolver 130 to determine that an access request is for a different domain with a different IP address and subnet. The XDA filter 118 can query the client cache 132 and/or trigger queries of the ISP cache 136 and/or the domain data 144 to determine the registrant of each of the domains 116 and 124. The registrant information can define a common owner name, common contact information, or other grouping or alias information that indicates common ownership. Thus, using a robust set of heuristics, many attempted accesses that may initially appear to be unsafe XDA events, can be allowed to proceed with a low risk to the client system 104.

FIG. 2 depicts an example of the types of data 200 that may be included in the client cache 132, ISP cache 136, and/or domain data 144 of FIG. 1. For example, the data 200 can include a domain name 202, IP address 204, registrant (owner) 206, contact information 208, expiration date 210, as well as other information not depicted. The data 200 may also include group or alias information for the registrants 206, for example, common parent company or consortium information. The expiration date 210 may be used in the domain data 144 and substituted with a time to live parameter in the client cache 132 and ISP cache 136 to update caches more frequently. In one example, domain 116 of FIG. 1 can have a domain name 212 of "example.com" with an IP address 214 of "111.255.012.210" for web server 114, a registrant 216 of "Example, Inc.", contact information 218 of "123 Main St. Springfield, USA", and an entry expiration date 220 of "Nov-1-2011". Upon receiving a cross-domain access request, it may be determined that domain 124 of FIG. 1 has a domain name 222 of "zyxt12.com" with an IP address 224 of "011.245.312.124" for web server 122, a registrant 226 of "Example, Inc.", contact information 228 of "123 Main St. Springfield, USA", and an entry expiration date 230 of "Dec-1-2011". Thus, applying the XDA heuristics 128 as previously described, common ownership characteristics can be established in this example by common values in the registrant fields 216 and 226, even though the domain names 212 and 22 and IP addresses 214 and 224 are different. It will be understood that the full contents of the data 200 need not physically reside in the same table at a common server, but may be determined from a collection of multiple data sources.

Figure 3:
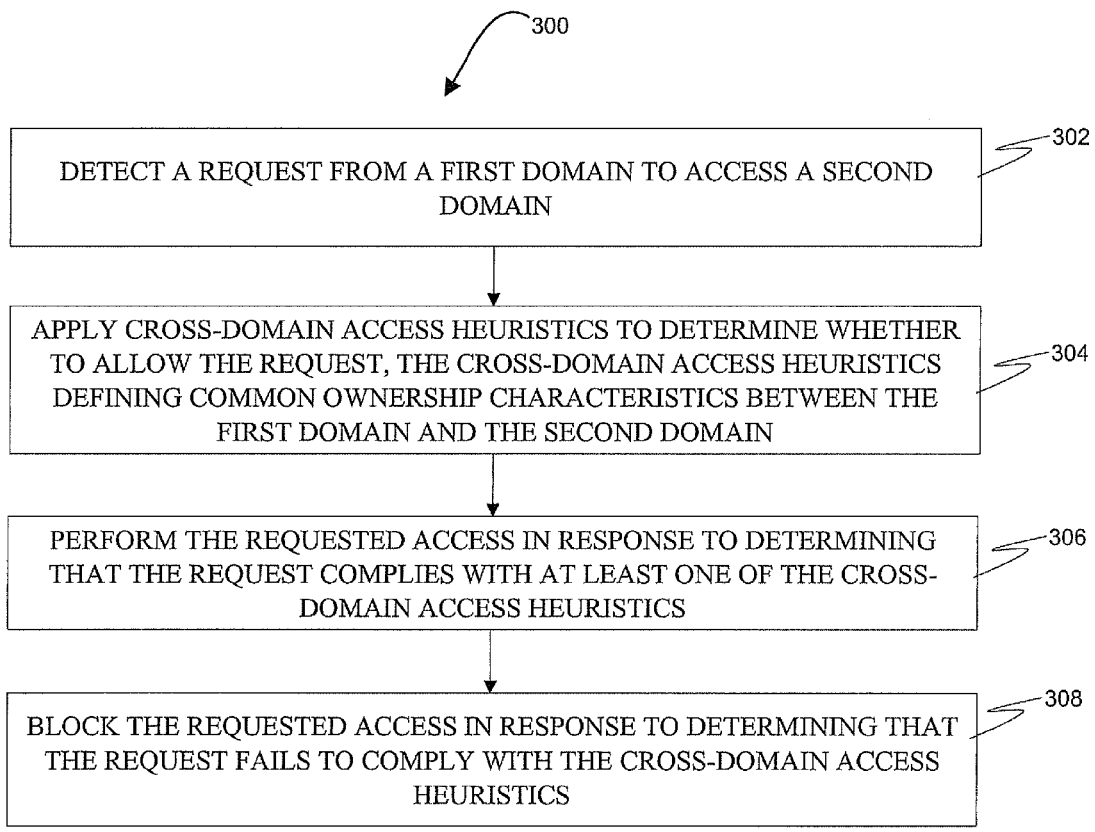
FIG. 3 depicts an exemplary process for cross-domain access prevention.

Turning now to FIG. 3, a process 300 for cross-domain access prevention will now be described in accordance with exemplary embodiments, and in reference to FIGS. 1 and 2. At block 302, the XDA filter 118 detects a request from a first domain (e.g., domain 116) to access a second domain (e.g., domain 124). The request can be received in response to a user of the client system 104 navigating via web browser 110 to access HTTP-enabled content, such as one or more of the web pages 112. For example, a script can execute that attempts to access content on the second domain, such as web pages 120 of domain 124, which may contain harmful code/scripts and/or act as a repository for capturing information from the client system 104. Cross-domain accesses monitored by the XDA filter 118 are not limited to a hidden frame or a script in the web pages 112, but also includes links to images, regular links on the web pages 112 that a user might click, and the like. Thus, the XDA filter 118 can be applied to a wide variety of cross-domain accesses or to a subset thereof. Examples of cross-domain access requests that may be monitored by the XDA filter 118, further include, but are not limited to: an embedded or inline frame, whether hidden or displayed; an embedding of an image or other media artifact; a request of a style sheet; a request of a script include file (e.g., one requested via a tag such as <script src=(url)/>); any other request automatically performed by the web browser 110 when loading a page; a request from a user action such as clicking a link, moving a mouse, or any other user action; and, links invoked through other modules loaded into a page, such as COM objects, Microsoft Silverlight, Java Applets, Flash components, Google Gears components, or others.

At block 304, the XDA filter 118 applies the XDA heuristics 128 to determine whether to allow the request. The XDA heuristics 128 define common ownership characteristics between the first domain and the second domain, which may be based on domain name, IP address, subnet, owner/registrant, or group affiliation. Examples of heuristics in the XDA heuristics 128 include allowing the request in response to determining that the first domain and the second domain have a common higher-level domain, IP address, subnet, or owner. Other examples for comparison may include common contact information, such as contact information 208 of FIG. 2. In comparing ownership characteristics between the first domain and the second domain, an exact match need not be found, as similarity can be applied. For example, with a lower security configuration, a heuristic may be satisfied if registrant data has the first N characters in common, or only differs by less than Y characters. This can account for different entry formats for the same company in different records. Higher security settings may require exact matches to avoid intentionally similar names of rogue registrants. Security settings, as well as enabling and disabling of the XDA filter 118 and heuristics of the XDA heuristics 128 can be controlled using the web browser 110.

The XDA filter 118 may access a cache (e.g., client cache 132) to determine the common ownership characteristics for the first and second domains using the client domain resolver 130. The client domain resolver 130 or the XDA filter 118 can initiate a request to a domain resolver (e.g., ISP domain resolver 134 and/or domain resolver 142) for domain data (e.g., in ISP cache 136 and/or domain data 144) in response to failing to locate the common ownership characteristics for at least one of the first and second domains in the client cache 132.

At block 306, the XDA filter 118 performs the requested access in response to determining that the request complies with at least one of the XDA heuristics 128. At block 308, the XDA filter 118 blocks the requested access in response to determining that the request fails to comply with the XDA heuristics 128.

Technical effects include cross-domain access prevention. A cross-domain access filter on a client-side computer system can monitor for access attempts to other domains when accessing content on a first domain. When the access attempts are detected, the filter can apply heuristics to determine whether to allow or block the requested access attempts. The heuristics may define common ownership characteristics, such as a common higher-level domain name, common IP address or subnet, or that are registered to a common owner. Assuming that content at the first domain is desired and trusted, the heuristics are designed to continue with the assumption, that scripts or other code attempting to access a different domain with common ownership characteristics should also be allowed. The filter can be enabled/disabled depending upon the desired security level.

The capabilities of the present invention can be implemented in software, firmware, hardware or some combination thereof.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), a digital versatile disc (DVD), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
   accessing, via a processor, web-enabled content in a first domain including automatically executing a script in the content to receive request access to a web page in a second domain, the script being embedded in the web-enabled content;
   detecting, via the processor, the request from the first domain to access the second domain;
   applying, via the processor, cross-domain access heuristics to determine whether to allow the request, the cross-domain access heuristics defining determining common ownership characteristics between the first domain and the second domain;

executing, via the processor, a client domain resolver for determining an associated Internet Protocol (IP) address or subnet for the second domain and storing the associated IP address or subnet in at least one cache, the executing of the client domain resolver in response to failing to determine the common ownership characteristics between the first and second domains;

performing, via the processor, the requested access in response to determining that the request complies with at least one of the cross-domain access heuristics; and blocking, via the processor, the requested access in response to determining that the request fails to comply with the cross-domain access heuristics; and deleting, via the processor, the stored IP address or subnet in the at least one cache in response to the performing of the requested access or the blocking of the requested access.

2. The method of claim 1 wherein the cross-domain access heuristics further comprise allowing the request in response to determining that the first domain and the second domain have a common higher-level domain.

3. The method of claim 1 wherein the cross-domain access heuristics further comprise allowing the request in response to determining that the first domain and the second domain have a common Internet Protocol (IP) address or subnet.

4. The method of claim 1 further comprising:
querying domain registration data for the first domain and the second domain, wherein the cross-domain access heuristics further comprise allowing the request in response to determining that the first domain and the second domain are registered to a common owner.

5. The method of claim 4 wherein the common owner is determined as a function of similarity between registrants of the first and second domains as members of a common group.

6. The method of claim 1 further comprising:
accessing the at least one cache to determine the common ownership characteristics for the first and second domains,
initiating a request to a domain resolver for domain data in response to failing to locate the common ownership characteristics for at least one of the first and second domains in the cache.

7. The method of claim 1 further comprising:
enabling and disabling the detecting and applying in response to security settings of a web browser.

8. The method of claim 1 wherein the request is from hypertext transfer protocol (HTTP)-enabled content of the first domain to access HTTP-enabled content of the second domain.

9. The method of claim 1 wherein the access request from the first domain is initiated via one of a: script, frame, embedded media, style sheet, include file, page loading, user action, and links invoked through modules on a page.

10. A system comprising a processor configured to perform a method, the method comprising:
a computer processing system configured to receive the request from the first domain including performing:
accessing web-enabled content in a first domain including automatically executing a script in the content to receive request access to a web page in a second domain, the script being embedded in the content;
detecting the request from the first domain to access the second domain;

applying cross-domain access heuristics to determine whether to allow the request, the cross-domain access heuristics defining determining common ownership characteristics between the first domain and the second domain;

executing a client domain resolver for determining an associated Internet Protocol (IP) address or subnet for the second domain and storing the associated IP address or subnet in at least one cache, the executing of the client domain resolver in response to failing to determine the common ownership characteristics between the first and second domains;

performing the requested access in response to determining that the request complies with at least one of the cross-domain access heuristics; and blocking the requested access in response to determining that the request fails to comply with the cross-domain access heuristics; and deleting the stored IP address or subnet in the at least one cache in response to the performing of the requested access or the blocking of the requested access.

11. The system of claim 10 further comprising:
a web browser executing on the processing system, the cross-domain access filter filtering hypertext transfer protocol (HTTP)-enabled content from the first domain accessed via the web browser.

12. The system of claim 10 wherein the cross-domain access heuristics further comprise allowing the request in response to determining that the first domain and the second domain have a common higher-level domain.

13. The system of claim 10 wherein the cross-domain access heuristics further comprise allowing the request in response to determining that the first domain and the second domain have a common Internet Protocol (IP) address or subnet.

14. The system of claim 10 wherein the cross-domain access filter further performs:
querying domain registration data for the first domain and the second domain, wherein the cross-domain access heuristics further comprise allowing the request in response to determining that the first domain and the second domain are registered to a common owner, the common owner determined as a function of similarity between registrants of the first and second domains as members of a common group.

15. A computer program product comprising:
a non-transitory, tangible computer readable storage medium readable by a processing unit and storing instructions for execution by the processing unit for implementing a method, the method comprising:
accessing web-enabled content in a first domain including automatically executing a script in the content to receive request access to a web page in a second domain, the script being embedded in the web-enabled content;
detecting the request from the first domain to access the second domain;
applying cross-domain access heuristics to determine whether to allow the request, the cross-domain access heuristics defining determining common ownership characteristics between the first domain and the second domain;
executing a client domain resolver for determining an associated Internet Protocol (IP) address or subnet for the second domain and storing the associated IP address or subnet in at least one cache, the executing of the client domain resolver in response to failing to determine the common ownership characteristics between the first and second domains;

performing the requested access in response to determining that the request complies with at least one of the cross-domain access heuristics; and blocking the requested access in response to determining that the request fails to comply with the at least one of the cross-domain access heuristics; and deleting the stored IP address or subnet in the at least one cache in response to the performing of the requested access or the blocking of the requested access.

16. The computer program product of claim 15 wherein the at least one of the cross-domain access heuristics further comprise comprising the method of allowing the request in response to determining that the first domain and the second domain have a common higher-level domain.

17. The computer program product of claim 15 wherein the cross-domain access heuristics further comprise comprising the method of allowing the request in response to determining that the first domain and the second domain have a common Internet Protocol (IP) address or subnet.

18. The computer program product of claim 15, wherein the method further comprising:

querying domain registration data for the first domain and the second domain, wherein the cross-domain access heuristics further comprise allowing the request in response to determining that the first domain and the second domain are registered to a common owner.

19. The computer program product of claim 15, wherein the method further comprising:

accessing the at least one cache to determine the common ownership characteristics for the first and second domains, initiating a request to a domain resolver for domain data in response to failing to locate the common ownership characteristics for at least one of the first and second domains in the cache, wherein the cache is one of a local cache and a server cache.

20. The computer program product of claim 15 further comprising:

enabling and disabling the detecting and applying in response to security settings of a web browser, wherein the request is from hypertext transfer protocol (HTTP)-enabled content of the first domain to access HTTP-enabled content of the second domain.

* * * * *